US006071064A

United States Patent [19]
Hackett

[11] Patent Number: 6,071,064
[45] Date of Patent: Jun. 6, 2000

[54] WHEEL CHAIR TRANSPORT VEHICLE

[76] Inventor: Desmond Ignatius Hackett, 47 Kingston Road., Port PIrie, South Australia, 5540, Australia

[21] Appl. No.: 08/930,556

[22] PCT Filed: Apr. 4, 1996

[86] PCT No.: PCT/AU96/00204

§ 371 Date: Oct. 2, 1997

§ 102(e) Date: Oct. 2, 1997

[87] PCT Pub. No.: WO96/31362

PCT Pub. Date: Oct. 10, 1996

[30] Foreign Application Priority Data

Apr. 4, 1995 [AU] Australia ................................ PN2166

[51] Int. Cl.[7] ...................................................... B60P 1/44

[52] U.S. Cl. .......................... 414/545; 414/495; 414/812; 414/921

[58] Field of Search .................................... 414/921, 495, 414/537, 540, 541, 544, 545, 556

[56] References Cited

U.S. PATENT DOCUMENTS

| | | | |
|---|---|---|---|
| 3,051,335 | 8/1962 | Bartlett | 214/75 |
| 3,258,139 | 6/1966 | Ridgeway | 214/77 |
| 4,071,152 | 1/1978 | Kinkead et al. | 214/75 |
| 4,168,134 | 9/1979 | Pohl | 414/545 |
| 4,219,104 | 8/1980 | MacLeod | 187/9 |
| 4,285,416 | 8/1981 | Dudynskyi | 187/9 |
| 4,299,528 | 11/1981 | Kazeil et al. | 414/546 |
| 4,378,658 | 4/1983 | DeLorean | 49/379 |
| 4,684,166 | 8/1987 | Kanodia | 296/146 |
| 4,804,308 | 2/1989 | Hamblin et al. | 414/540 |
| 4,991,905 | 2/1991 | Watanabe et al. | 296/155 |
| 5,370,493 | 12/1994 | Oshima | 414/556 |
| 5,417,470 | 5/1995 | Holt | 296/188 |
| 5,470,125 | 11/1995 | Yamazaki | 296/146.6 |

FOREIGN PATENT DOCUMENTS

| | | |
|---|---|---|
| 75781 | 5/1975 | Australia . |
| 95-108868 | 4/1995 | Japan . |
| 1087012 | 10/1967 | United Kingdom . |
| 2 140 749 | 9/1984 | United Kingdom . |
| WO 95/19158 | 7/1995 | WIPO . |

*Primary Examiner*—Dean J. Kramer
*Assistant Examiner*—Gerald J. O'Connor
*Attorney, Agent, or Firm*—Finnegan, Henderson, Farabow, Garrett & Dunner, L.L.P.

[57] ABSTRACT

A vehicle (1) for the transport of persons in wheel chairs, the vehicle (1) being of the panel van type with a side loading door (7). The vehicle (1) is modified by removing the chassis or sub-frame adjacent the door opening (3), installing a lifting platform (9) within the confines of the vehicle for access through the door opening (3), and providing a door (7) hinged from the roof, the door having strengthening members (26) such that when in the closed position of the door (7), the strength and rigidity of the vehicle (1), as a result of removing the chassis or sub-frame, is restored.

12 Claims, 8 Drawing Sheets

WHEEL CHAIR TRANSPORT VEHICLE

This invention relates to a wheel chair transport vehicle, more particularly to a vehicle whereby the person in a wheelchair can easily and safely board a vehicle.

BACKGROUND OF THE INVENTION

Vehicles for the transport of persons in wheelchairs are known. These include the type of vehicle where the wheel base of a passenger vehicle has been extended to provide a larger area behind the front seat sufficient to accommodate a wheel chair. To enter the vehicle a portable ramp is provided to extend from the side of the vehicle onto the footpath, roadway, or other area. Thus a separate ramp has to be carried and positioned before the person can enter or leave the vehicle. Once in the vehicle the wheel chair has to be turned 90 degrees this being done in a confined space. Another form of vehicle has an entry from the rear of the vehicle, the vehicle being essentially a commercial vehicle with rear opening doors, a converted commercial vehicle. A lifting platform is provided on the rear of the vehicle which must be lowered before the rear doors are opened, the platform being usually hydraulically operated. However this lifting platform extends from the rear of the vehicle and thus protrudes into the surrounding area. Many persons may not appreciate the lifting action and being lifted without any surrounding visible support. Once the desired height has been reached, the person then is wheeled into the vehicle. The platform is then lowered, the rear doors closed, and the platform folded to the vertical position outside the closed doors before the vehicle can be moved.

In each of these examples as the ramp or lifting platform extends from the vehicle, an access space is required either beside or behind the vehicle. Also the person is totally exposed to the public view, and the weather elements during this operation.

Another example of such a vehicle is shown in GB1087012 where the chassis of the vehicle is extended rearwardly behind the rear wheels, and a lifting platform is provided between the chassis extensions. However, this extends the length of the vehicle making it difficult to park in parking bays with sufficient clearance behind the vehicle to provide wheel chair access to and from the vehicle. Also U.S. Pat. No. 3,051,335 describes a load transport vehicle or truck with a rear loading platform, the gain access to the rear of the vehicle, a bottom frame is pivoted to each side of the body of the vehicle, and is opened during loading and unloading operations. This frame member carries the vehicle's required safety lights, and is closed during operation of the vehicle, the frame member covering the rear edge of the platform.

Thus with GB 1087012 and U.S. Pat. No. 3,051,335 access to the vehicle is only from the rear, the lifting platform being an addition to the rear of the vehicle, and is attached to the chassis members or body of the vehicle or an extension thereof without weakening or interrupting the longitudinal structural rigidity of the vehicle.

U.S. Pat. No. 4,804,308 describes a further form of vehicle for transporting persons in wheel chairs. In this instance a large passenger bus in which a wheel chair lift is provided, which the lift platform serves as part of the floor of the vehicle, and does not need to be extended outwardly of the vehicle to load or unload a wheel chair passenger. Due to the width of the vehicle, the structural members of the vehicle are not disturbed by providing this facility in the vehicle, for this facility is positioned outwardly of the longitudinal structural members.

However while this facility is provided in a large passenger bus it is an object of this invention to provide a lift for a person in a wheel chair, with the lift being provided by a portion of the floor of a small vehicle.

BRIEF STATEMENT OF THE INVENTION

There is provided according to the invention a method of providing wheel chair access to a front wheel drive vehicle, the method including the steps of removing a portion of the chassis members or sub-frame at a door opening on a side of the vehicle, installing a lifting platform to traverse from floor level to ground level, providing a strengthening member around at least a portion of the door opening, and providing a strengthening member in the door to latch into said door strengthening member to maintain the structural rigidity of the vehicle.

In another aspect of the invention there is provided a vehicle having wheel chair access, said vehicle having a portion of the floor of the vehicle which raises and lowers to provide a lifting platform for the wheel chair, an access opening adjacent the lifting platform, said vehicle having a portion of the chassis members or sub-frame removed to provide said access opening, strengthening members surrounding at least a portion of said access opening, a door closing said access opening, said door having at least one strengthening member to latch into said strengthened surround to provide rigidity to the vehicle.

In a further alternative of the invention instead of the door containing the strengthening members to latch into the door surround, the lifting platform may have a strengthening member to latch into the strengthened surround, or into the adjacent sub-frame portions.

In a still further aspect of the invention the vehicle may be provided with lifting jacks or adjustable supports to support the vehicle adjacent the access opening when the platform is being used in lieu of or additional to the substantial door surround to prevent flexure of the vehicle at this area during operation of the lift platform.

BRIEF DESCRIPTION OF THE DRAWINGS

In order to more fully describe the invention reference will now be made to the accompanying drawings in which.

DESCRIPTION OF THE PREFERRED EMBODIMENT.

The invention is directed to the modification of a transporter type panelvan motor vehicle of the front wheel drive type to give ease of entry along with safe handling for persons in a wheel chair, or other persons such as invalid persons or any static load. Preferably the invention is readily applicable to a front wheel drive vehicle which thus has a lower floor level and also the application of the invention to the vehicle is not hampered by the tail shaft and drive tunnel found in front engined rear wheel drive vehicles.

Figure 5:
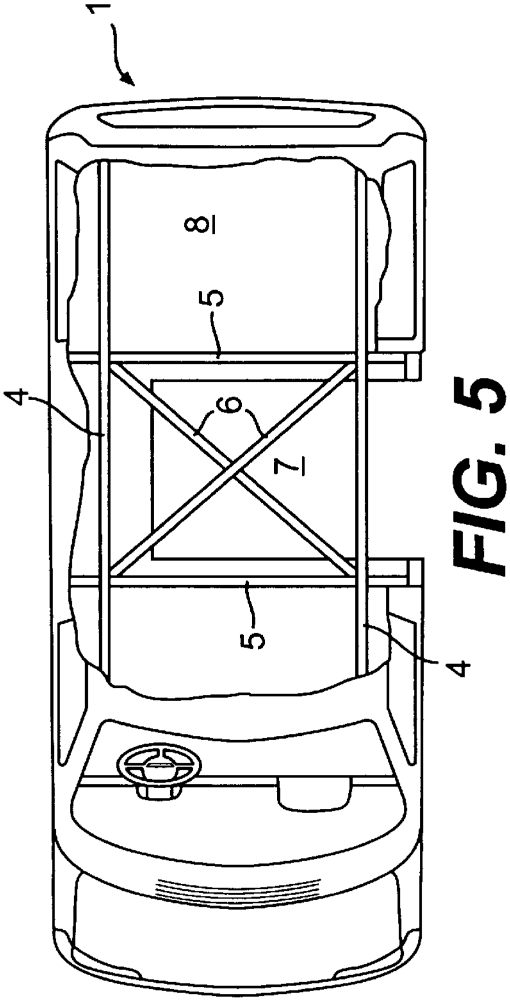
FIG. 5 is a plan view of the vehicle with portion removed showing an embodiment of the strengthening of the vehicle.
Figure 6:
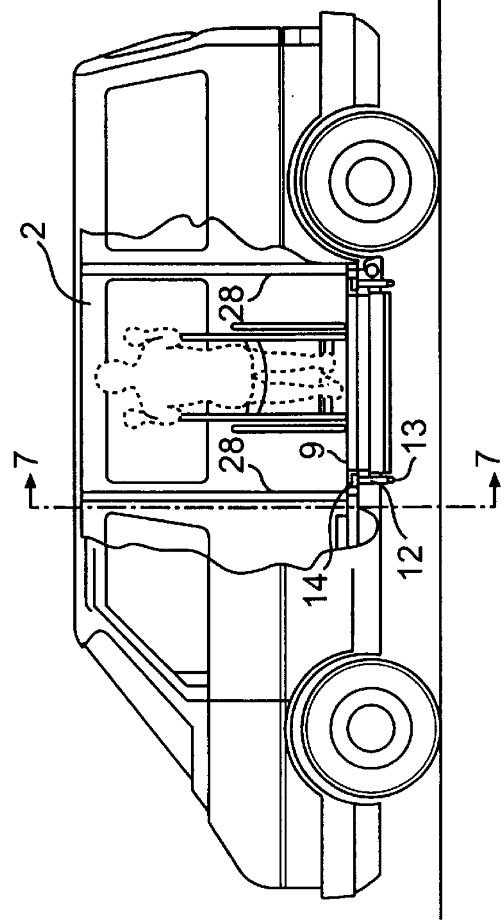
FIG. 6 is a side view with portion removed showing the wheel chair and occupant in the vehicle.
Figure 7:
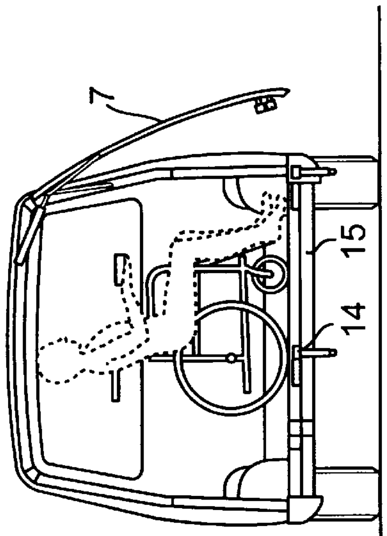
FIG. 7 is a sectional view facing rearward on the lines 7—7 of FIG. 6.

As shown in the drawings the invention is applied to the left hand sliding door of a right hand drive vehicle, or the right hand sliding door of a left hand drive vehicle (not shown). As shown the vehicle 1 has the sliding door removed and the left hand sub frame 2 removed in the position of the sliding door opening 3. Due to the removal of portion of the sub frame it may be necessary to strengthen the vehicle. One example is shown in FIG. 5 where longitudinal strengthening members 4 are positioned adjacent the roof, with cross 5 and diagonal bracing 6 over the area of the removed sub frame. This strengthening of the vehicle in this manner is required to prevent twisting of the vehicle body while the door is open during the loading of the vehicle and in the event that the vehicle is positioned on an uneven surface.

A portion 7 of the floor 8 of the vehicle is removed and into the removed floor area is fitted a movable floor 9, the floor having side and end perimeter members 10 and 11. To the side members 10 there are positioned lifting jacks 12, four such jacks being shown in the example shown in the drawings, one end 13 of each of the jacks being attached to the side members 10 of the movable floor and the other end 14 to frame members 15 on the sides of the opening 7 in the floor 8. The jacks are preferably electric motor screw thread design to ensure positive operation and that each jack operates simultaneously. Alternately the jacks can be hydraulically operated from a hydraulic power system installed in the vehicle. In a preferred form the electric motors for the jacks are stepper motors so that the position of the movable floor can be accurately controlled.

To ensure that the area between the movable floor and the floor of the vehicle along the sides and the end opposite the door opening are closed, there are provided walls 16 which can be, as illustrated, a number of overlapping plates 17 which slide one against the other plates as the movable floor raises and lowers. Preferably there are provided seals between the adjacent plates to ensure that the walls are weatherproof. It will be realised that other forms of telescopic or collapsible walls can be provided, such as a foldable and weatherproof fabric.

Figure 8A:
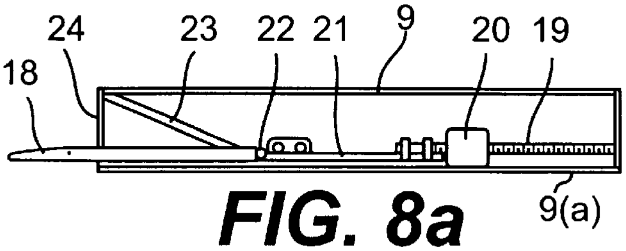
FIGS. 8(*a*), (*b*) and (*c*) illustrate one embodiment of extending the ramp.
Figure 8B:
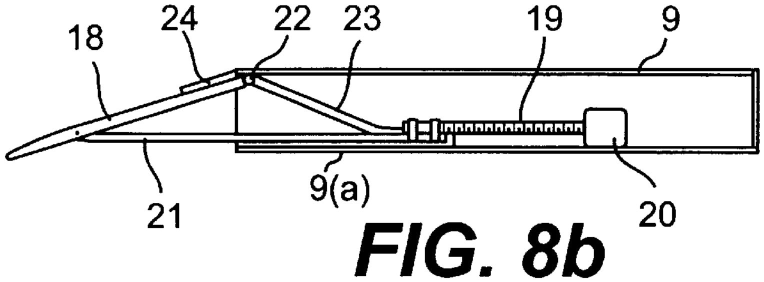
Figure 8C:
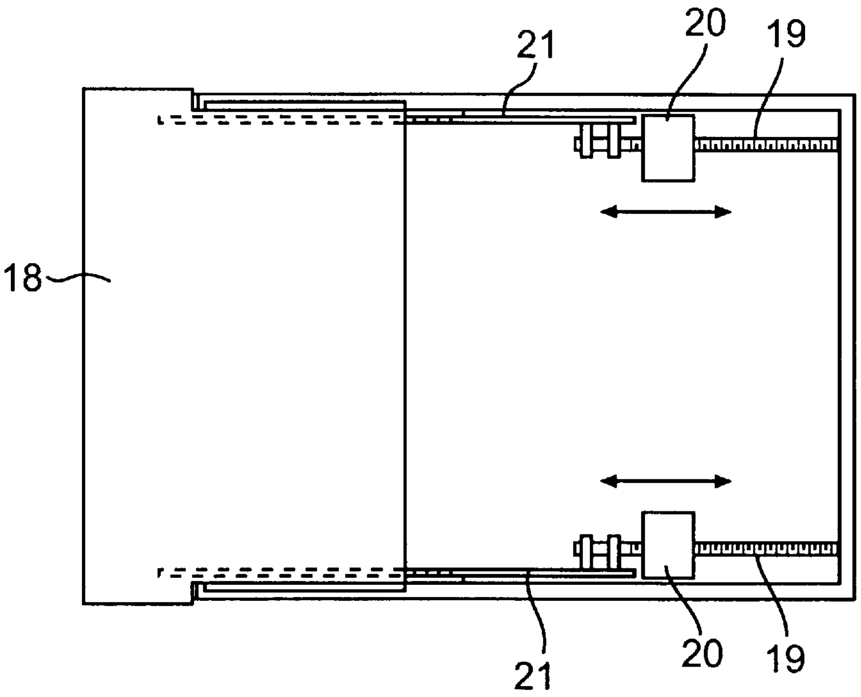

A ramp 18 is provided to extend from the floor 9. As shown in FIGS. 8(*a*), (*b*) and (*c*) and 9(*a*), (*b*) and (*c*) the floor 9 is a hollow section having a lower floor plate 19, and in the space between the floor 9 and floor plate 9(*a*) there is provided a mechanism for extending the ramp 18. In FIGS. 8(*a*), (*b*) and (*c*) the ramp 18 is extended by screws 19 driven by electric motors 20, these being spaced on opposite sides of the floor. The ramp 18 is pivotally connected toward the end of the ramp to a thruster member 21, while the rear or inner end of the ramp has a pin 22 slidable in an inclined guide 23 so that as the ramp is extended the rear end rises to thus cause the ramp to extend at a downwardly extending angle to the floor 9. The hollow section of the floor is closed by a pivoted door 24 when the ramp is in its inner position, and is opened by the ramp during the extension of the ramp.

Figure 9A:
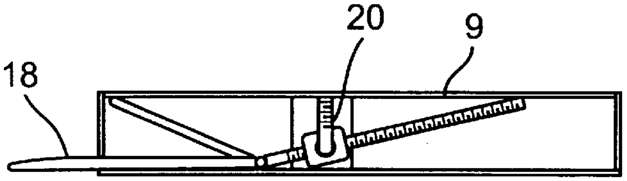
FIGS. 9(*a*), (*b*) and (*c*) illustrate a further embodiment of extending the ramp, FIG. 10 diagrammatically illustrates the movable floor and ramp when the vehicle is positioned adjacent a curb.
Figure 9A:
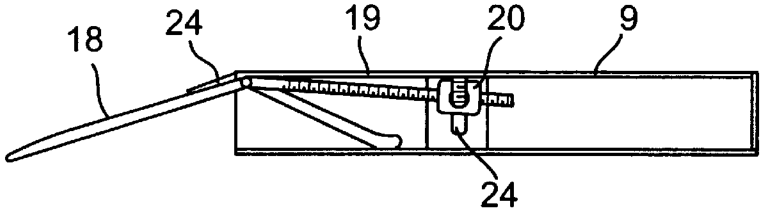
Figure 9C:
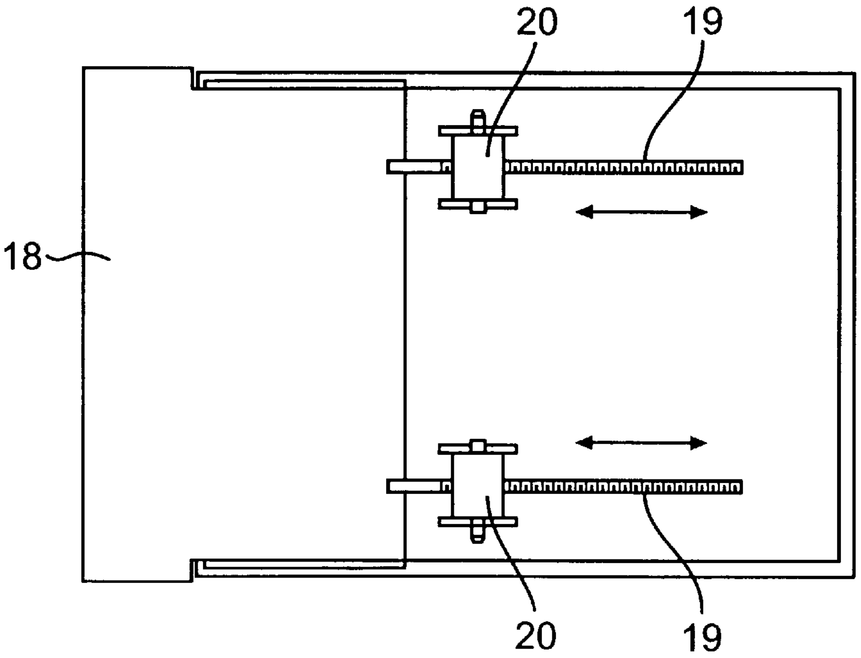

FIGS. 9(*a*), (*b*) and (*c*) show a further form of ramp extension. As described above the screws are pivoted to the inner end of the ramp 18 by pins 22 which slide in the inclined guides 23. However, in this embodiment, the electric motors are suspended on a spring loaded member 24 so that as the ramp is extended the electric motors 20 move between the positions shown in 9(*a*) and 9(*b*).

Figure 1:
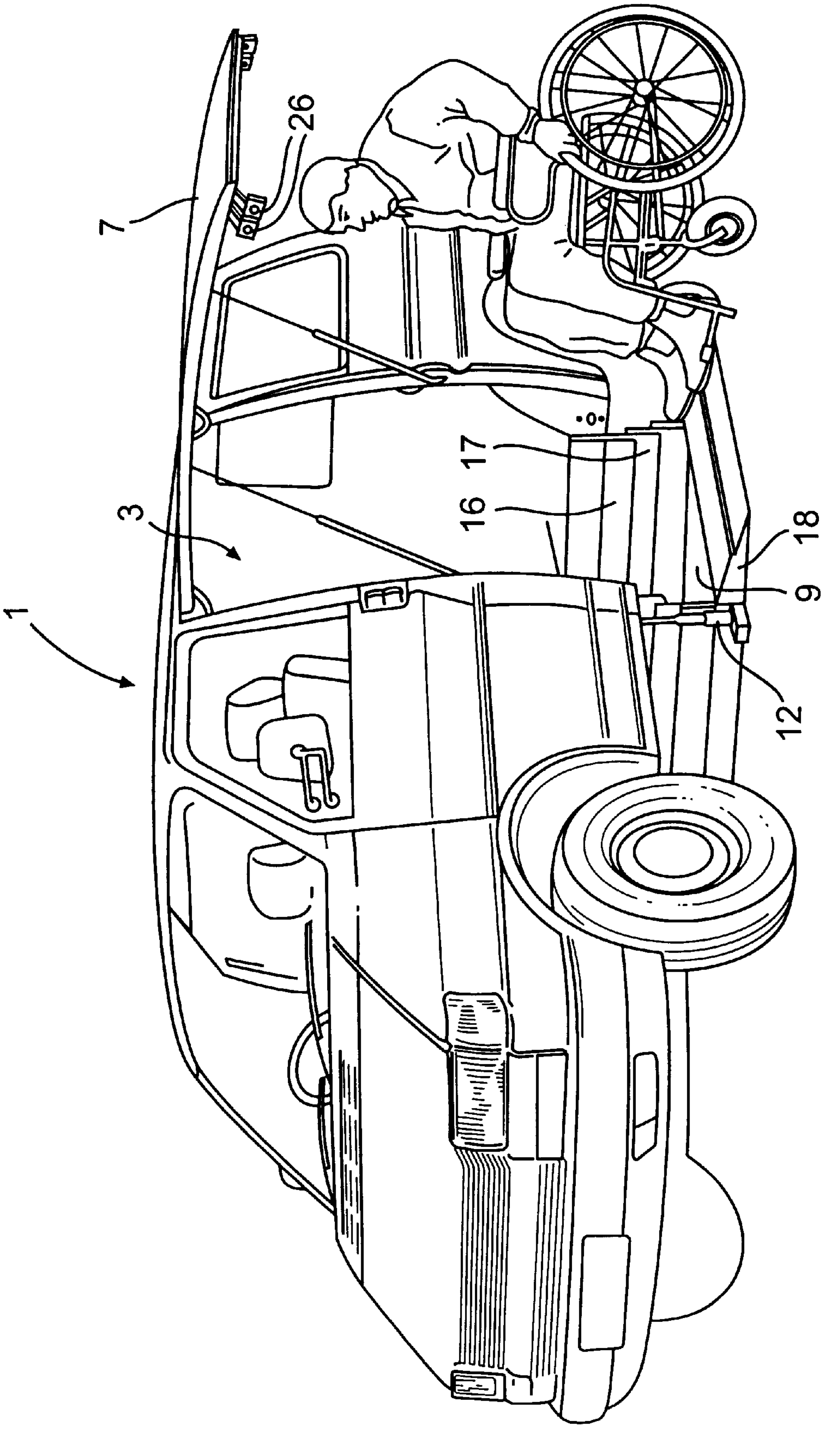
FIG. 1 is a perspective view of a vehicle with the access opening in the open position ready for entry by a user.
Figure 3:
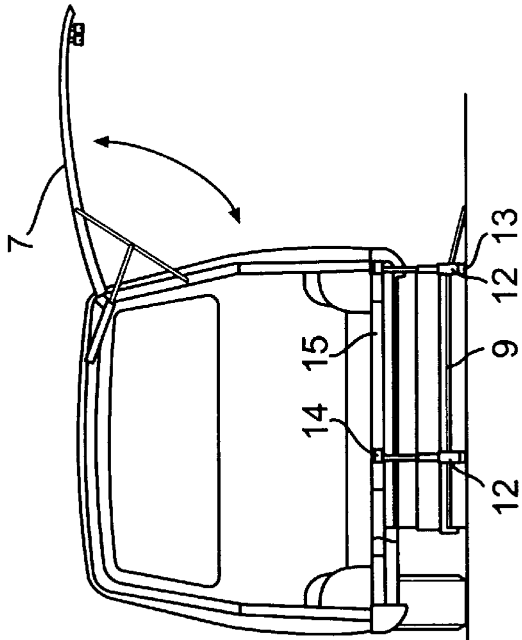
FIG. 3 is a sectional view facing rearward on the lines 3—3 of FIG. 2.
Figure 2:
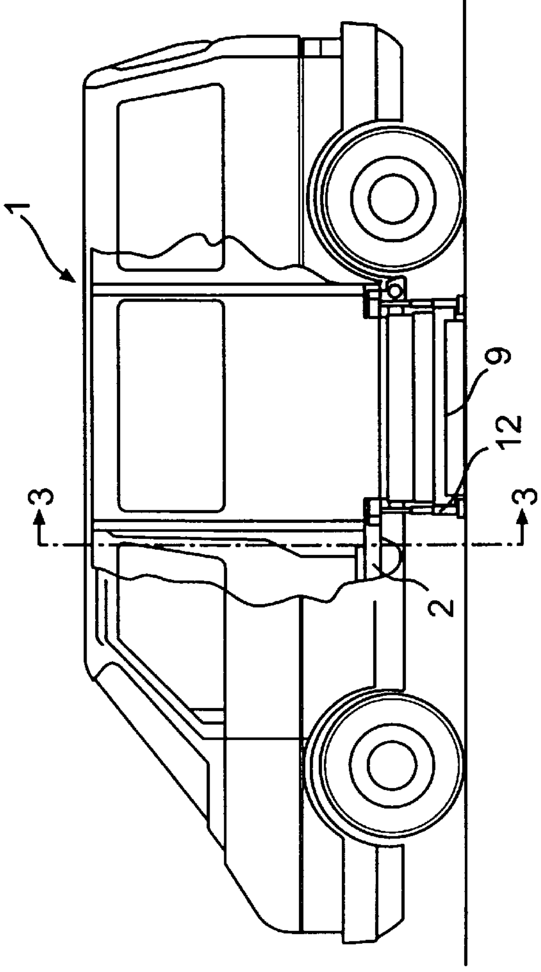
FIG. 2 is a side view of the vehicle with portion broken away to show the movable floor in the lowered position.
Figure 4:
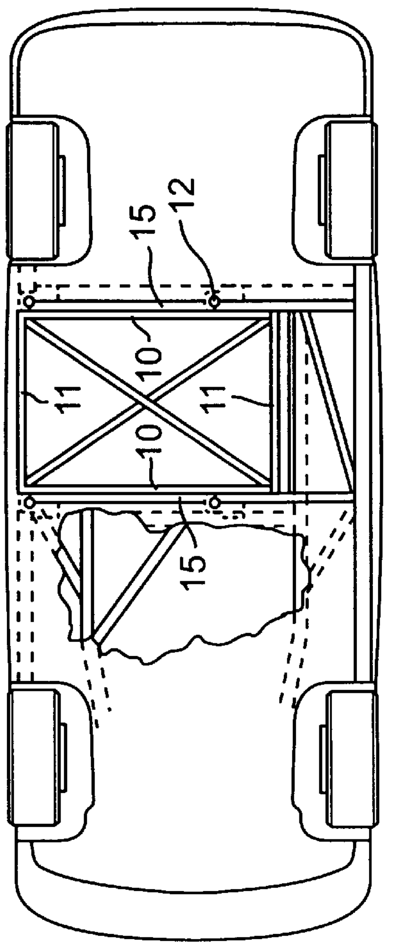
FIG. 4 is an underneath view of the vehicle showing details of the movable floor.
Figure 10:
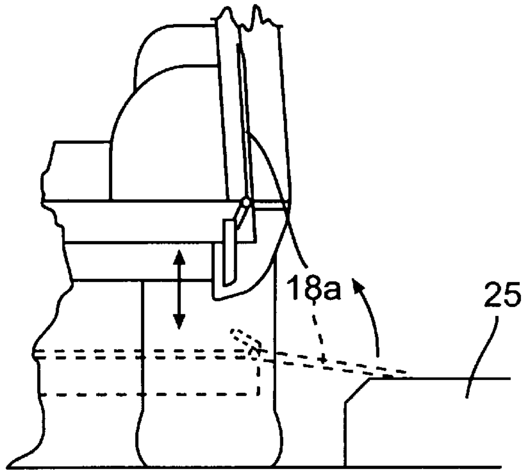

In FIG. 1 the floor is shown lowered to its lowermost position with the ramp extended to rest on the surface on which the vehicle is positioned. FIG. 10 illustrates an alternate form of ramp with the vehicle positioned beside a curb, the floor being lowered to the position where a flip down ramp 18(*a*) rests on the curb 25, the ramp 18(*a*) being stowed in the upper position when not in use.

Figure 12:
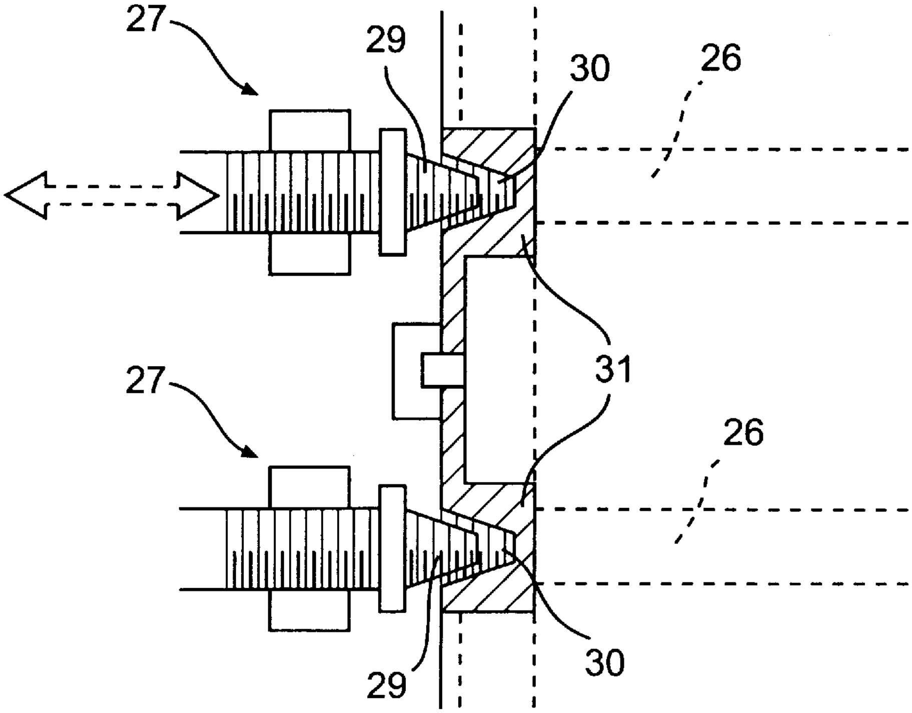
FIG. 12 shows one embodiment for locking the door in the closed position.

Previously there is described the provision to prevent flexing of the vehicle when the door is in the open position due to the removal of portion of the sub frame. In order to strengthen the vehicle across the door opening 3 during movement of the vehicle, the lower portion of the door 7 has strengthening members 26 extending across the door. When the door 7 is closed these strengthening members 26 are locked into locking members 27 in the door surround frame 28 which in turn are mounted on the ends of the sub frame 2. On locking of the door in the closed position, the strengthening members 26 in effect form the replacement portion of the sub frame. As shown in FIG. 12 electrically driven tapered screws 29 on the frame 28 engage in tapered sockets 30 in plates 31 on the ends of the strengthening members 26.

Figure 13A:
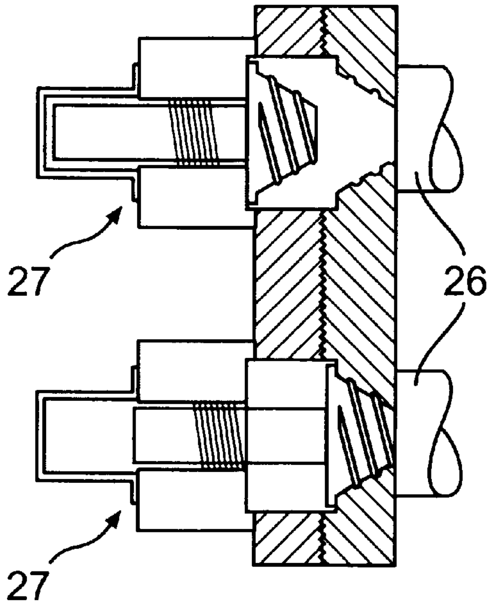
FIGS. 13(*a*), (*b*) and (*c*) show a further embodiment for locking the door in the closed position.
Figure 13B:
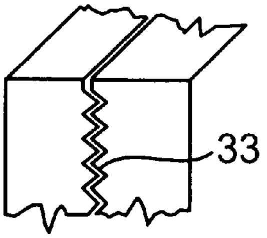
Figure 13C:
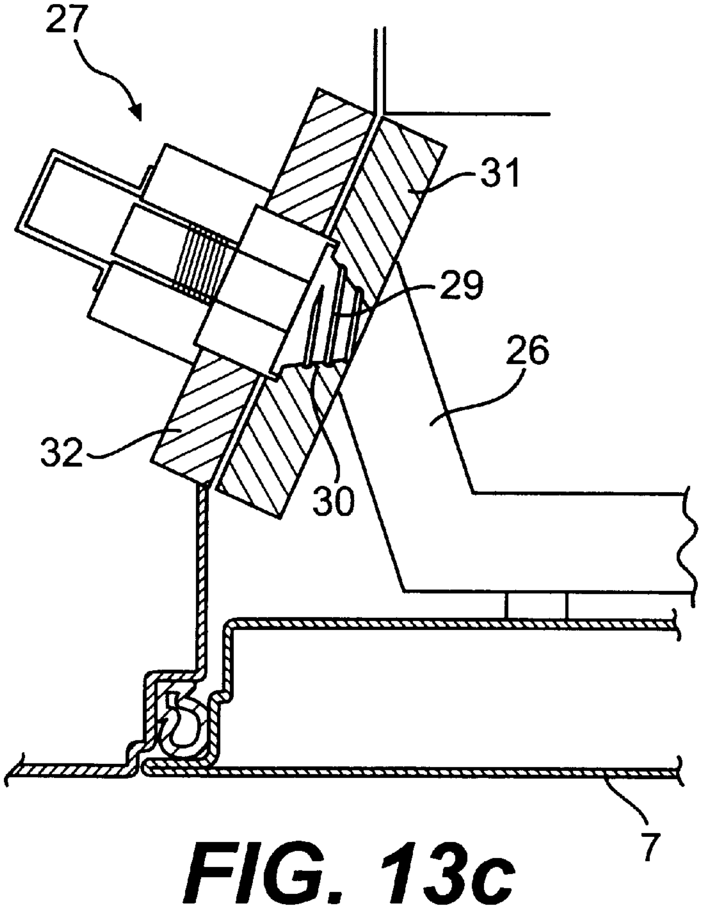
Figure 14A:
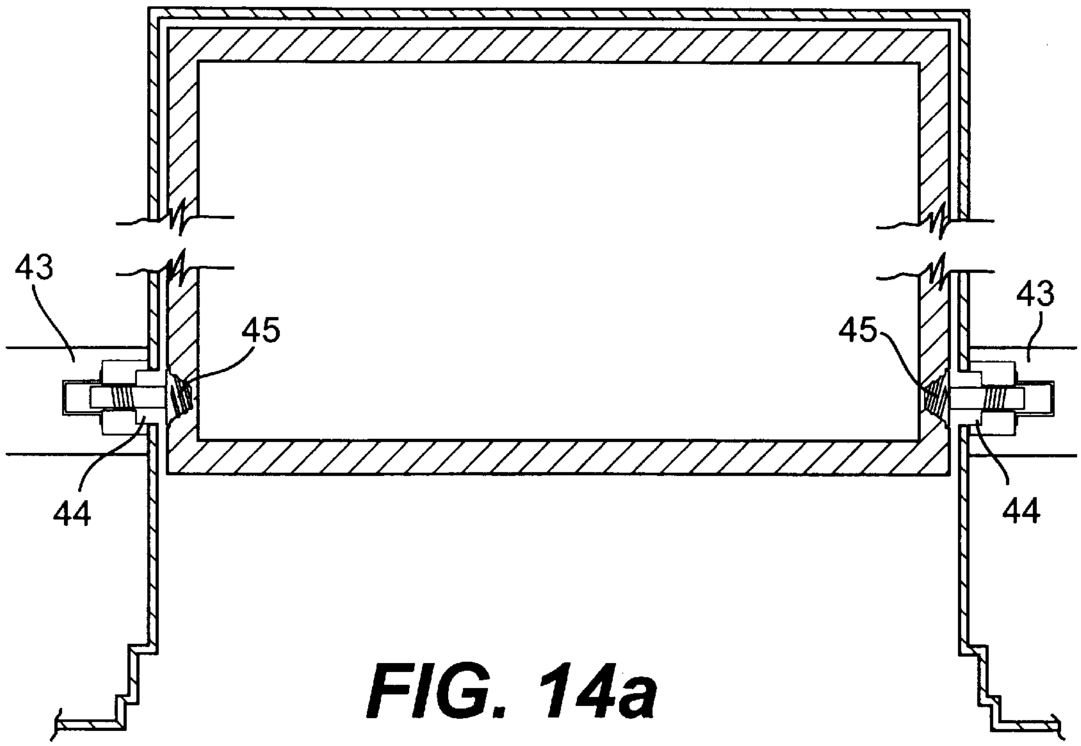
FIGS. 14(*a*) and (*b*) show a further embodiment having a strengthened movable floor.
Figure 14B:
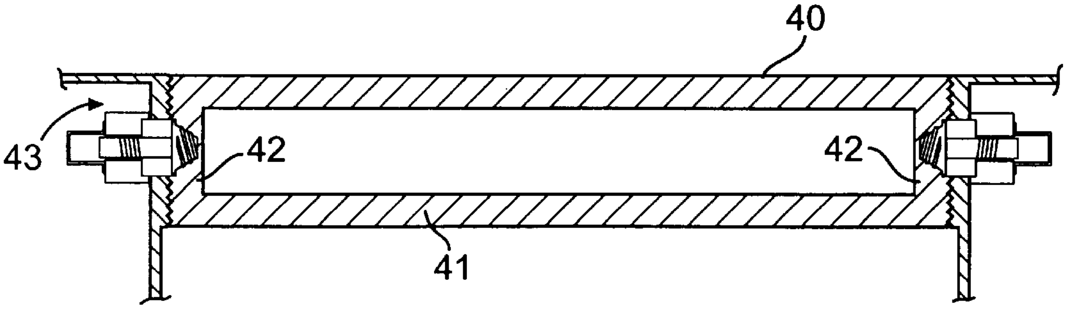

In FIGS. 13(*a*), (*b*) and (*c*) there is shown another embodiment for locking and securing the door.

In this embodiment the locking members, as seen in plan, are at an angle to the transverse axis of the vehicle, so that as the door closes the plate 31 on the ends of the strengthening members 26 meet the locking plates 32 on the door frame in a face to face contact. This gives a better locating position than the closing action in the previous embodiment. Again there are electrically operated tapered screws 29 to engage in tapered threaded sockets 30 in the end plates of the strengthening members. In order to assist in preventing relative movement between the door and door frame, the mating surfaces are provided with a serrated or saw tooth configuration as shown in detail A of FIG. 13(*b*).

Figure 11:
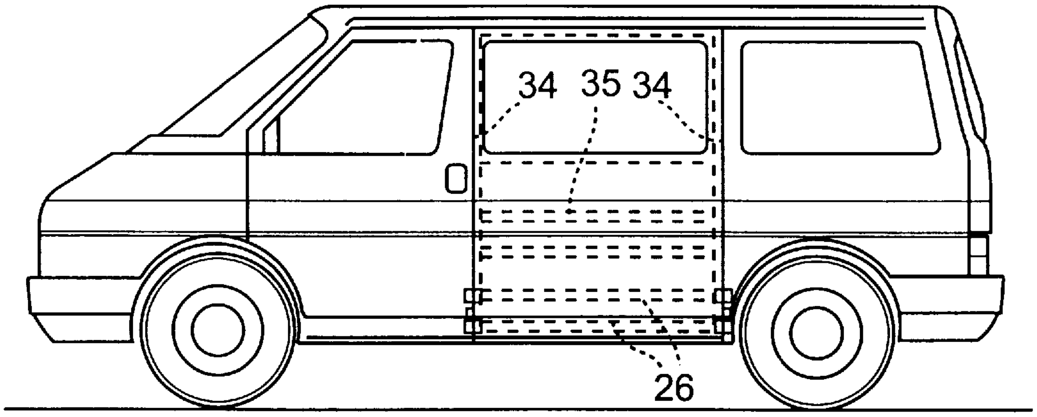
FIG. 11 shows in dotted lines one embodiment for strengthening the door.

Additionally also the door itself may be strengthened as shown in FIG. 11 by a frame 34 and cross members 35 to assist in retaining the structural rigidity of the vehicle. Preferably also the door can be operated hydraulically so that it is not necessary to manually handle the door which, due to the strengthening members would be heavier than a conventional door.

The door and floor can only be operated if the vehicle is stationary and the hand brake applied. A switch attached to the hand brake is activated once the hand brake is applied, making it possible to operate the door and floor. The controls for the door and floor are conveniently mounted near the driver's seat of the vehicle. A remote control system is also employed making it possible for disabled persons to access the vehicle unassisted. The locking and latching of the door can be manually controlled, or alternately when the door is lowered to the closed position the tapered latching screws can be automatically actuated. In either case there are provided manual over-ride mechanisms to raise and lower the door and to latch and unlatch the door.

The floor cannot be lowered until the door is opened, the floor being lowered the required distance depending on whether the vehicle is positioned adjacent a curb or not. When the floor is lowered the ramp is extended to allow easy access of the wheel chair on to the lowered floor. On entry into the vehicle, the floor can then be positioned and adjusted to various positions to accommodate various heights of wheel chairs and occupants, and subsequently locked transversely to the main frame and reinforcement of the vehicle in the selected intermediate position.

When the disabled person has boarded the vehicle, with the removal of the passenger seat or the installation of a swivelling drivers seat it becomes a user friendly task for a disabled driver to enter and drive the vehicle.

In order to modify the vehicle to incorporate the invention the body shell is first reinforced with a metal fabricated and welded frame to reduce the torsion twisting of the vehicle while the door is open. This type of strengthening will depend on the type of vehicle being modified and could well vary from the strengthening of the vehicle above described. In some vehicles it may be necessary to re-route the exhaust system and the handbrake cable to clear the area where the lowerable floor section is to be installed. The removed floor section is reinforced and the lifting and lowering mechanisms installed. The lowerable floor section is then mounted in place along with the sliding walls or covers to protect the occupants feet and to provide a weather proof enclosure for the lowerable floor section during operation of the vehicle if the floor has to be positioned in a lowered position due to the height of the wheel chair and occupant. The ramp and necessary wiring, switching and electronics and/or hydraulics used to control the floor mechanism and ramp are also installed. The door is reinforced, again depending on the type of vehicle and door, and the necessary electronics, wiring and hydraulics and mechanics for the lifting and locking mechanism are then installed. Finally the vehicle is finished including weather strips, trim and painting.

The removable floor is thus operator controlled, either by the disabled person or by the accompanying person and can be lowered to ground level or to a suitable position where the extendable ramp will extend to be in a position to align with the surface on which the person in a wheel chair is positioned. Thus a wheel chair, or other disabled person who cannot negotiate steps, or even a load to be carried in the vehicle can be positioned on the movable floor and raised to the floor level of the vehicle to be repositioned and secured.

In a preferred form of the invention as applied to a particular vehicle having a right hand drive, a section of the load compartment floor is removed. This is encompassed within a line taken from the rearmost alignment of the sliding door lock panel and the forward most alignment of the left hand rear quarter panel and a line which runs spaced from and parallel to the left hand side of the right hand side chassis/sub frame located under the floor panel. This line will dissect the two afore mentioned lines along with the left hand foot step to be cut away to allow the installation of the movable floor along with the necessary supports and reinforcing. For left hand drive vehicles the converse will apply. The above lines and alignments are given as an example only, and could vary from the above depending on the vehicle to which the invention is applied.

The strengthening of the access opening around the door and or the body shell will maintain the rigidity of the vehicle when stationary and when loading and unloading the vehicle. Instead or with a lesser access or body shell strengthening, hydraulic or other types of jacks or support members may be lowered adjacent the door opening to prevent or minimise the likelihood of flexure of the vehicle at this point. The reinforcing bars in the door, when locked to the door surround return the vehicle to the strength and rigidity required as if the sub frame were not removed at this location.

In an alternate form of the invention the movable floor 9 is provided with strengthening members 40 forming the upper perimeter of the floor 9 and members 41 forming the lower perimeter of the floor, these being joined by vertical members 42 to thus form a strong rigid frame for the floor 9. In the sub frame 43 a strengthened portion of the sub frame 43 there are provided one or more electrically driven tapered screws 44 to engage in threaded tapered sockets 45 in a frame of the floor. Thus when the tapered screws engage in the respective sockets, the strength of the chassis or sub-frame of the vehicle is restored through the frame of the movable floor.

This embodiment also provides that one or more tapered screws and/or tapered sockets can be positioned vertically so that the movable floor can be locked at selected heights while still maintaining the strength and rigidity of the vehicle. Also as the movable floor now restores the strength and rigidity of the vehicle, the sliding door of the vehicle can be retained, this being either power or otherwise driven. Also it may not be necessary to otherwise strengthen the door surround, or the vehicle chassis itself.

Thus it will be seen that there is provided a conversion of a vehicle so that persons in wheel chairs can easily enter the vehicle without the vehicle having to provide access space at the side or at the rear of the vehicle. The entry and exit of the vehicle is provided within the confines of the vehicle itself, the mechanism does not extend beyond the vehicle except for the small ramp, and the person is raised in a safe and secure manner.

It is to be realised that the invention has been described in respect of a particular vehicle. However it is to be realised that the invention can be applied to similar vehicles of the front wheel drive panel van type, and although one form of the invention has been described in some detail the invention is not to be limited thereto but can include variations and modifications falling within the spirit and scope of the invention.

I claim:

1. A vehicle having a wheel chair access, comprising:

a vehicle floor portion that raises and lowers to and from ground level to provide a lifting platform for a wheel chair;

an access opening in the side of the vehicle between front and rear wheels thereof, the access opening receiving the vehicle floor portion and being defined by a removed portion of vehicle chassis members or sub-frame and having top and opposite side edges;

structural strengthening members attached to the vehicle chassis members or sub-frame around the top and opposite side edges of the access opening;

a door for closing said access opening, said door having opposite sides;

at least one rigid strengthening member extending across the door to opposite ends located at the opposite sides of the door; and latch means for attaching the opposite ends of said at least one rigid strengthening member in the door to the structural members on each of the opposite side edges of the access open ing when the door is closing said access opening.

2. A vehicle as defined in claim 1 wherein the vehicle has a reinforced shell.

3. A vehicle as defined in claim 2 wherein the door is hinged to the structural strengthening members at the top edge of the access opening, said at least one rigid strengthening member in the door being positioned at a lower portion of the door.

4. A vehicle as defined in claim 3 wherein said latch means includes locking members comprising electrically actuated tapered screw members on the opposite ends of the at least one rigid strengthening member for engaging in tapered sockets in the structural strengthening members on opposite sides of the access opening.

5. A vehicle as defined in claim 3 and including hydraulically operated actuators to control the opening and closing of the door.

6. A vehicle as defined in claim 1 including side members on a portion of the vehicle surrounding said lifting platform, lifting members attached to said side members and to said lifting platform, and control means to control the lifting members.

7. A vehicle as defined in claim 6 wherein said lifting members are screw members, and include an electric stepper motor for driving the screw members.

8. A vehicle as defined in claim 1 and including an extendable ramp positioned in the lifting platform and extending from the floor to provide easy access to said lifting platform, a reversible motor, and a screw driven by the reversible electric motor to extend and retract said ramp.

9. A vehicle as defined in claim 1 and including control means positioned adjacent the driver of the vehicle for controlling the opening and closing of the door and the raising and lowering of the movable platform.

10. A method of providing wheel chair access to a vehicle by a vertically movable platform on which a wheel chair is positioned to lift the wheel chair, the method comprising the steps of:

removing a portion of a chassis member or sub-frame at a door opening at a side of the vehicle between front and rear wheels thereof to provide a recess for said wheel chair access, the door opening having top and opposite side edges;

installing the vertically movable platform in said recess to traverse between floor level to ground level;

attaching a structural strengthening member to said chassis member or sub-frame around the top and opposite side edges of the door opening;

providing a door having opposite sides and movable to a closed position in the door opening;

providing at least one rigid strengthening member in the door, the rigid strengthening member extending across the door to opposite ends at the opposite sides of the door; and attaching the opposite ends of the rigid strengthening member to the structural strengthening member at the opposite side edges of the door opening when the door is in the closed position.

11. A vehicle having a wheel chair access, comprising:

a vehicle floor portion that raises and lowers to and from ground level to provide a lifting platform for a wheel chair;

an access opening in the side of the vehicle between front and rear wheels thereof, the access opening receiving the vehicle floor portion and being defined by a removed portion of vehicle chassis members or sub-frame;

structural strengthening members attached to the vehicle chassis members or sub-frame around the vehicle floor portion;

at least one rigid strengthening member within said lifting platform;

latch means on opposite sides of said platform for attaching said at least one rigid strengthening member to the strengthening members attached to the vehicle chassis members or sub-frame; and a door closing said access opening.

12. A vehicle as defined in claim 11, wherein the door is a power driven sliding door to close said access opening.

* * * * *